(12) United States Patent
Rigas

(10) Patent No.: US 7,437,781 B2
(45) Date of Patent: Oct. 21, 2008

(54) TOILET SEAT COVER SCALE DEVICE

(75) Inventor: Peter E. Rigas, Yardley, PA (US)

(73) Assignee: Pleo Originals, LLC, Yardley, PA (US)

( * ) Notice: Subject to any disclaimer, the term of this patent is extended or adjusted under 35 U.S.C. 154(b) by 589 days.

(21) Appl. No.: 11/228,954

(22) Filed: Sep. 16, 2005

(65) Prior Publication Data

US 2007/0061953 A1 Mar. 22, 2007

(51) Int. Cl.
*A47K 13/12* (2006.01)
(52) U.S. Cl. .................. 4/661; 4/236; 4/242.1; 177/144; 177/245
(58) Field of Classification Search .......... 4/234, 4/236, 242.1, 661; 177/144, 245
See application file for complete search history.

(56) References Cited

U.S. PATENT DOCUMENTS 2,057,024 A * 10/1936 Gunnison ............... 177/144
4,697,656 A * 10/1987 de Canecaude ............. 177/144
4,920,583 A 5/1990 Hough et al.
5,182,823 A 2/1993 Alsip
6,003,160 A 12/1999 Seidle et al.
6,785,912 B1 9/2004 Julio
2003/0046009 A1 * 3/2003 Honda ......................... 702/19

* cited by examiner

*Primary Examiner*—Robert M Fetsuga
(74) *Attorney, Agent, or Firm*—Kenneth P. Glynn

(57) ABSTRACT

A toilet seat cover scale device for weighing a person or an object includes, in combination, a toilet seat cover including hinges for hinged attachment to a toilet seat, a scale mechanism connected to the toilet seat cover, the scale mechanism having at least two force sensors located on a bottom of the toilet seat cover for contact with a toilet seat when the toilet seat cover is attached to a toilet seat and is in a closed position. The force sensors transmit the weight force measurements to a processor, which converts the weight force measurements to an accurate total weight measurement, and the processor transmits the accurate total weight measurement to a display.

20 Claims, 3 Drawing Sheets

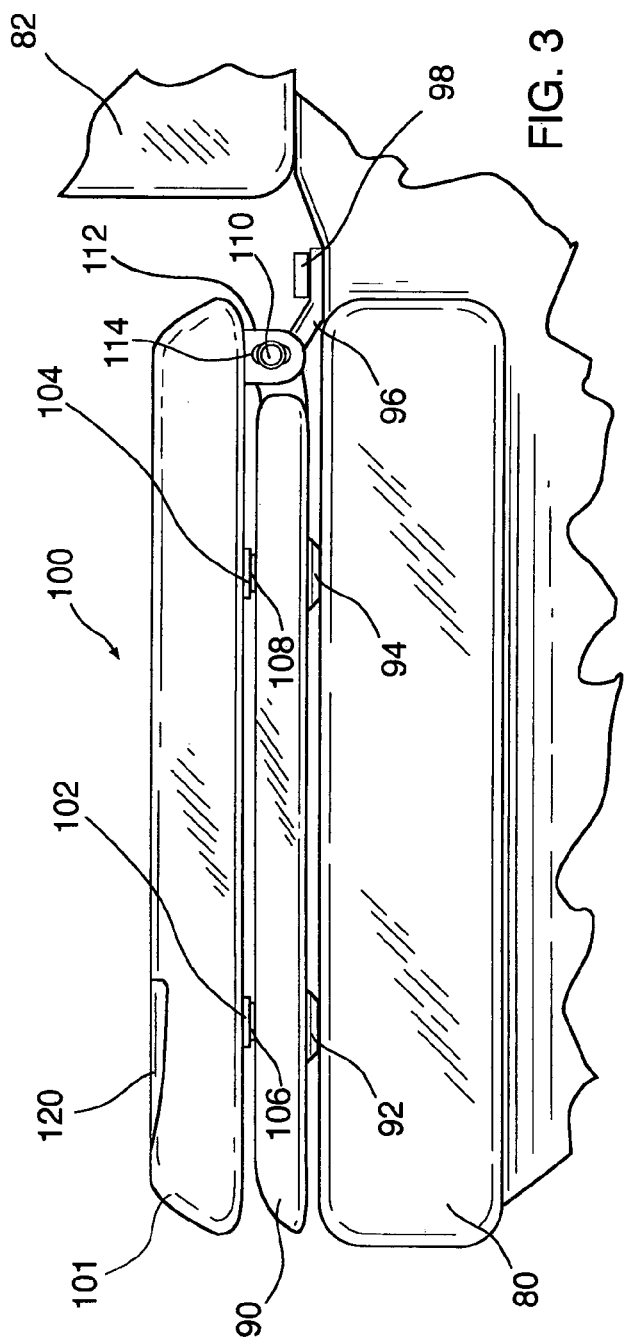
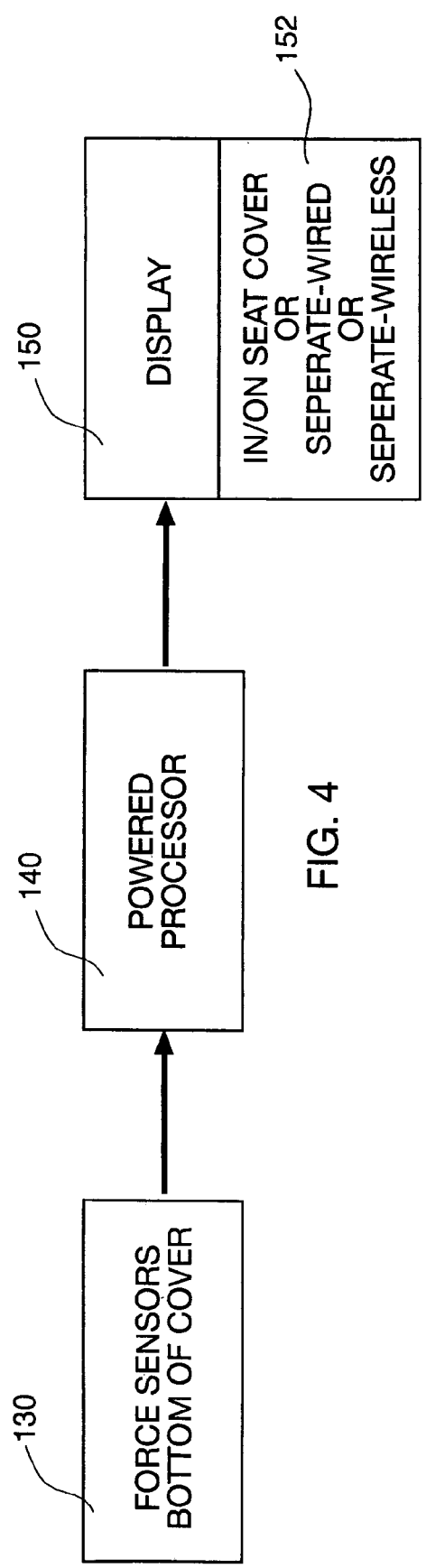
FIG. 3
FIG. 4

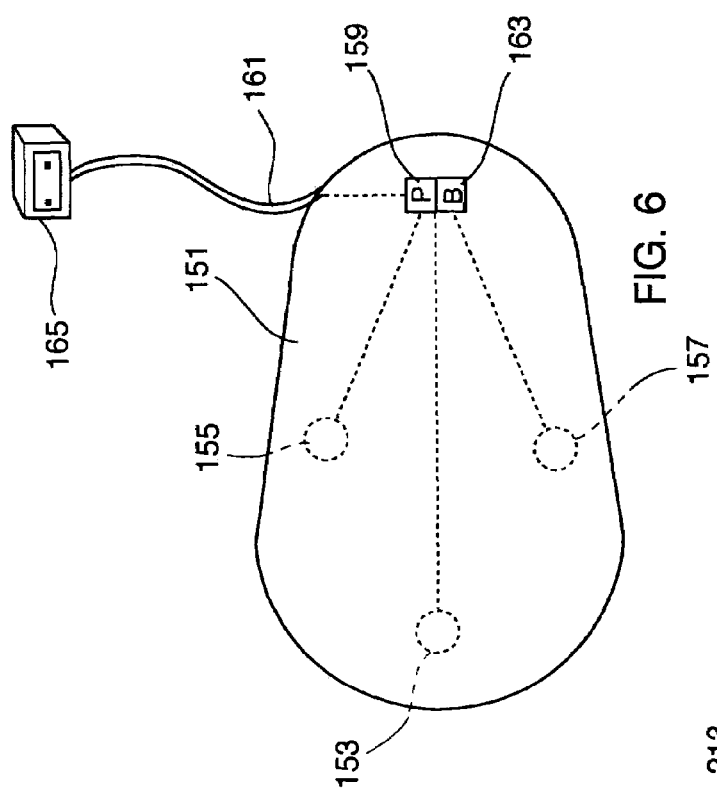
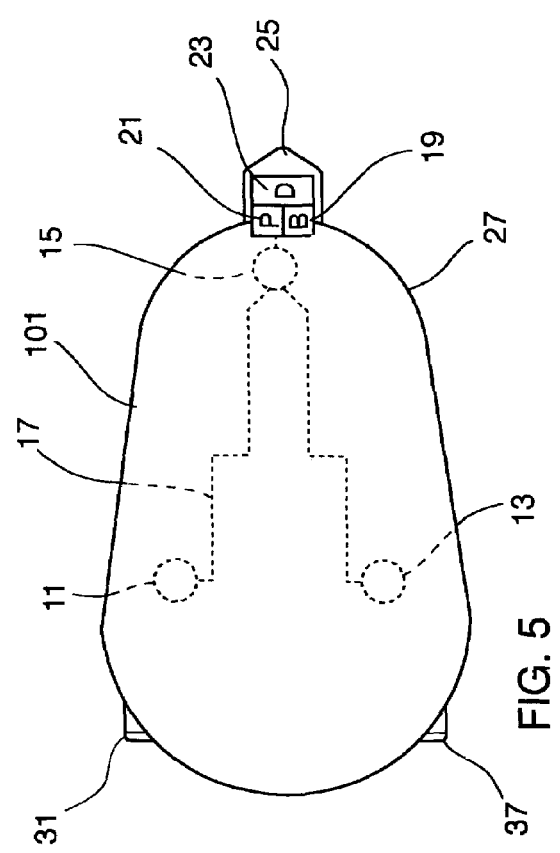
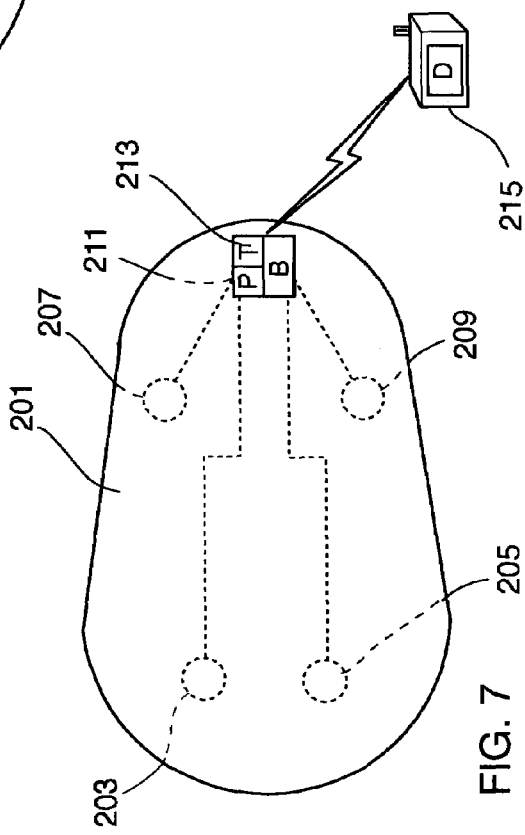
FIG. 5
FIG. 6
FIG. 7

TOILET SEAT COVER SCALE DEVICE

BACKGROUND OF THE INVENTION

1. Field of the Invention

The present invention relates to a toilet seat scale device that may be used by anyone to weigh himself or herself by merely sitting on the seat cover, rather than standing on a scale. It offers an alternative to a stand on scale for everyone and is a space saver as well. This invention is also particularly advantageous for people with mobility and standing difficulties, including wheel chair-based persons, other persons with ambulatory problems, persons with balancing problems and other fragile persons, such as very old people.

2. Information Disclosure Statement

The following patents relate to scales and/or toilet related features:

U.S. Pat. No. 6,785,912 B1 shows a toilet seat that uses an electric generator, powerable by batteries, to generate negative ions that are dispersed into the toilet bowl to achieve odor control. The seat is configured like a standard toilet seat and is designed to be low-cost. This prior art patent merely shows the use of battery powered devices in conjunction with toilets.

U.S. Pat. No. 6,003,160 shows a device mounted on a toilet lid that includes a lamp, a battery, a gravity switch and a light sensor, whereby the lamp is automatically lit in the absence of light when the toilet lid is raised, and is automatically extinguished when the light sensor senses light or when the toilet lid is lowered to rest on the toilet seat.

U.S. Pat. No. 5,182,823 describes a toilet seat clock for mounting on a toilet seat hingably attached to a toilet bowl having a toilet seat and a cover hingably attached to the bowl. The clock apparatus is mounted on the toilet seat in a chamber provided in a forward portion of a toilet seat, the chamber extending through the toilet seat and the clock apparatus being, contained within a housing to be inserted in the chamber, the housing to be enclosed on the top by a transparent lens for viewing the display panel including the time display and being enclosed on the bottom by a base plate which is fastened by attachment members to the bottom surface of the toilet seat. A sealing member is provided for sealing the lens mounted on the upper surface of the seat for preventing the moisture from entering the chamber and contacting the clock apparatus, the clock apparatus being of conventional construction including a digital watch which is battery operated.

U.S. Pat. No. 4,920,583 describes a vibrating toilet seat, wherein a vibrating motor is placed within a cushioned toilet seat. The motor is automatically actuated when the user sits on the seat. The motor can also be turned on manually. Power for the vibrating unit can be derived from a battery pack, or the unit can be plugged into a standard wall outlet. The invention can be used in conjunction with existing cushioned toilet seats, which can be easily modified to accommodate the vibrator motor and switching mechanism. The invention is not limited to use with toilet seats, but can also be used with automobile seats, or with other types of seats.

U.S. Pat. No. 4,697,656 shows a weighing device that includes at least a force sensor integrated in a toilet seat resting on the upper edge of the bowl. The sensor works with an electronic unit including means for formatting the measurement signal that drives a means for displaying the user's weight, said means being placed on an extension of seat; the hinge along the X-X axis comprises an oblong hole to avoid affecting the measurement.

U.S. Pat. No. 2,057,024 describes a weighing device for toilets and the like, the combination of a toilet bowl, a toilet seat pivotally mounted at the one end on the top thereof, a weighing scale mechanism enclosed within the body of the toilet seat, and operating levers for said weighing scale mechanism extending through the bottom face of the toilet seat.

Notwithstanding the prior art, the present invention is neither taught nor rendered obvious thereby.

SUMMARY OF THE INVENTION

The present invention relates to a toilet seat cover scale device for weighing a person or an object. It includes, in combination, a toilet seat cover including hinge means for hinged attachment to a toilet seat; a scale mechanism connected to the toilet seat cover, the scale mechanism having at least two force sensors located on a bottom of the toilet seat cover for contact with a toilet seat when the toilet seat cover is attached to a toilet seat and is in a closed position. The force sensors have the capacity for weight force measurement and the means to transmit the weight force measurement to a processor. The scale mechanism processor converts weight force measurements to an accurate total weight measurement, and the processor has means to transmit the accurate total weight measurement to a display. There is also a power means connected to the processor to provide power thereto. This power means could be house current, but is preferably an independent power source, such as one or more batteries, fuel cells, solar cells or some combination thereof.

The display is functionally connected to the scale mechanism processor for receiving and displaying the accurate total weight measurement.

In some embodiments of the present invention toilet seat cover scale device, the display is wired to the processor while in others, it may be connected wirelessly.

In some embodiments of the present invention toilet seat cover scale device, the display is firmly mounted to the toilet seat cover. In other embodiments, the display is movable and unconnected to the toilet seat except for wire for being wired to the processor. In yet other embodiments, the display is functionally connected to the processor with a wireless connection and is movable and may be wall mountable or flat-bottomed for resting on a horizontal surface or have features for either arrangement.

In some embodiments of the present invention toilet seat cover scale device, the scale mechanism includes at least two force sensors. In others, there are at least three force sensors, two of which are opposing side located, and one of which is forward located. Any geometries or layouts for the force sensors may be used without exceeding the scope of the present invention as long as they enable the device to produce accurate weight results, e.g., three sensors may be laid out with one in the back area and two in the front area.

In some embodiments of the present invention toilet seat cover scale device, the hinge means includes a floating hinge section to permit vertical movement of the toilet seat cover relative to a toilet seat to which it may be mounted, independent of the rotational movement between the toilet seat cover and the toilet seat.

The toilet seat cover of the present invention toilet seat cover scale device may be made of wood, plastic, metal or other material or combination of materials, but is preferably a plastic toilet seat cover.

In some embodiments of the present invention toilet seat cover scale device, power source is a battery and is removably connected for replacement thereof.

The toilet seat cover scale device display may be selected from the group consisting of an audio display, an LCD display, and LED display, a plasma display and combinations thereof.

The present invention is also directed to a toilet seat scale system, which includes: a.) a toilet seat cover including hinge means for hinged attachment to a toilet seat; b.) a scale mechanism connected to the toilet seat cover, the scale mechanism having at least two force sensors located on a bottom of the toilet seat cover for contact with a toilet seat when the toilet seat cover is attached to a toilet seat and is in a closed position, the force sensors having capacity for weight force measurement, means to transmit the weight force measurement to a processor, the scale mechanism including a processor for converting weight force measurements to an accurate total weight measurement, the processor having means to transmit the accurate total weight measurement in a display; c.) a display functionally connected to the scale mechanism processor for receiving and displaying the accurate total weight measurement; d.) power means connected to the processor to provide power thereto; and, e.) a toilet seat hingedly connected to the toilet seat cover.

BRIEF DESCRIPTION OF THE DRAWINGS

The present invention should be more fully understood when the specification herein is taken in conjunction with the drawings appended hereto wherein:

FIG. 3 shows a side cut view of a present invention mounted on a toilet;

FIG. 4 schematically illustrates a typical wiring and component arrangement;

FIG. 5 shows a top view of an alternative present invention device;

FIG. 6 shows a top view of another alternative present invention device; and,

FIG. 7 shows a top view of yet another alternative present invention device utilizing wireless transmission to the display.

DETAILED DESCRIPTION OF THE PRESENT INVENTION

Figure 1:
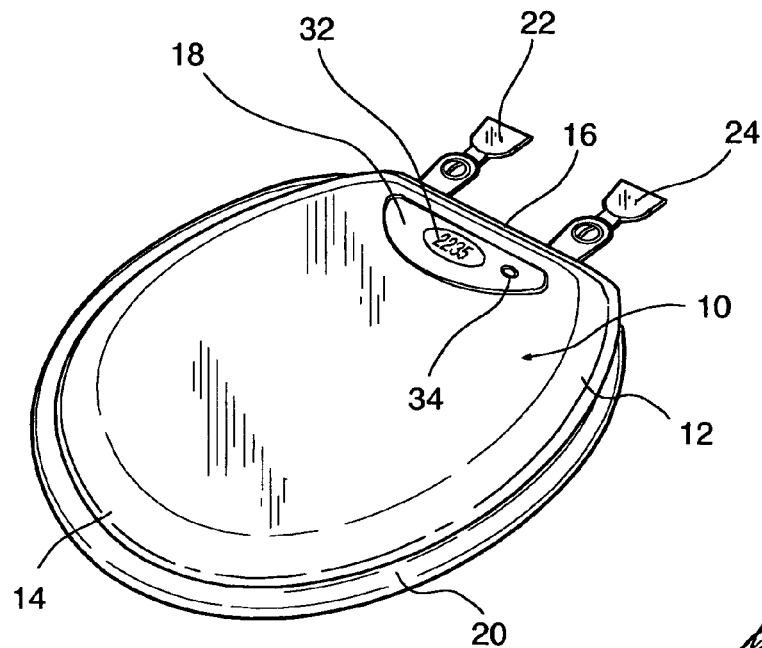
FIG. 1 illustrates an oblique top view of a preferred embodiment present invention device.
Figure 2:
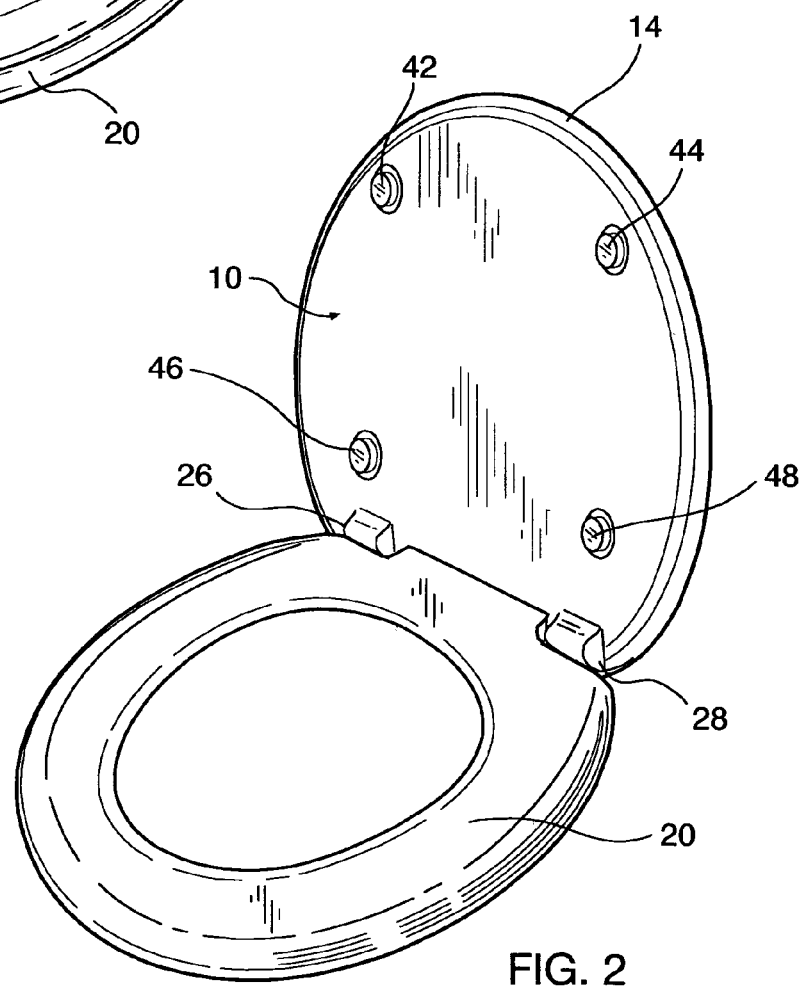
FIG. 2 shows another oblique view of the FIG. 1 present invention device, but with the cover opened to illustrate the force sensor locations.

FIG. 1 illustrates an oblique top view of a preferred embodiment present invention device toilet seat cover 10 attached to toilet seat 20. FIG. 2 shows another oblique view of the FIG. 1 present invention device cover 10 and seat 20, but with the cover 10 open to illustrate the force sensor positions, namely, sensors 42, 44, 46 and 48. Both Figures are described together and numbered components refer to either or both Figures in accordance with what is shown.

Cover 10 has a plastic molded body 12 with necessary wiring for connecting the scale parts embedded therein. Processor 18 includes a functional chip that receives force sensor data when a user is being weighed, and processes the data to minimally add the force sensor weights and transmit the results to the display 32. It may include Other features such as clock or clock and date calculating, storage of weighing history, a speaker and voice announcement of weight results, etc. The processor 18 is in a housing set into the cover 10 that also has a power supply, such as a battery or other cell, inside that is replaceable. Processor 18 is wired with the embedded wiring to the sensors 42, 44, 46 and 48. Optional on/off or on/sequence readout/off button 34 is connected to processor 18.

Cover 10 is hingedly connected to seat 20 with hinges 26 and 28, and the rotational shaft receivers may be enlarged to permit a small range of floating to eliminate any pull from the hinges 26 and 28 that might otherwise adversely affect the scale reading. Front 14 may be lifted and closed as is any toilet seat cover, and the floating hinge will not affect that functionality.

To use the present invention scale toilet seat cover 10, the cover 10 is in the closed (down) position. When a user sits on the cover 10 and picks up his/her feet, the sensors 42, 44, 46 and 48 press against the seat 20 that presses against a toilet rim (not shown), ad these sensors pick up their portion of the weight force, which is transmitted to the processor 18, where processing is rapidly completed and the total accurate weight will be displayed on display 32 (and optionally spoken out to the user, if the optional voice weight announcement feature and components are included with the device).

By using the cover 20 instead of the seat 10 for the scale, a number of advantages are achieved. One is that the display, processor and battery are behind the upended cover during male urination and are thus protected from accidental exposure to corrosive and damaging liquids. Another is that the user need not sit on the seat to be weighed. Another is ease of repair, as the cover is much easier to remove than is a seat. Another advantage is that the cover can be removed for any reason (repair) and not stop the functionality of the toilet. Another advantage is that children not yet large enough for the toilet seat can be held on the cover and weighed. Pets can be weighed without falling in or being frightened by the toilet. Likewise, luggage, small and large can be singularly or together weighed without the need to balance and the risk of falling in if the scale were on the seat instead of the cover. Many other advantages are also achieved with the present invention device, as can mow be seen from the description of the present invention set forth herein.

FIG. 3 shows a side view of present invention device toilet seat cover 100, that is similar to device 10 of FIG. 1. In this FIG. 3, toilet seat 90 is mounted on toilet 80 (and may be leaned against tank 82 when open). Seat 90 has its normal resting pods, such as pods 92 and 94, and is hinged at the rear end at axle 110 with bracket 96 and bolt 98 affixing it to be rotatably attached to toilet 80. Present invention cover 100 has pods such as pods 102 and 104 with force sensors 106 and 108 inside thereof and extending downwardly therefrom, and in contact with the top of seat 90. Cover 100 in rotatable independently of seat 90 and has a tall slot to render it vertically mobile so as to eliminate any hinge pull on a weighing process. Thus, slot 114 is narrow enough to hold onto axle 110 but is tall enough to provide a vertical free floating movement of the cover 100. The processor (inside, not shown) processes the weight information when activated and sends it to be displayed on front 101 display panel 120.

FIG. 4 illustrates schematically a typical wiring and component arrangement wherein force sensors 130 are located on the bottom of a cover and send weight information to a powered processor 140 for processing. The finished weight results (and optional information, such as date and/or time) are sent for presentation to display 150 having one of the arrangements 152.

As shown in FIG. 5, this embodiment of the present invention device includes three force sensors 11, 13 and 15 placed in a triangular symmetrical arrangement on the underside of cover 101. The sensors are integrated into seat cover 101 and are connected via electric wiring, such as wire 17, to an electronic processor unit 21 powered by batteries 19. The device processor unit 21 also formats measurement signals and calculates total added weight delivered by the sensors and transmits it to a digital display means 23 placed on an extension 25 of the front 27 of seat cover 01. Hinging connections 31 and 37 may be similar to those described above.

The total net weight measurement signal can alternatively be transmitted by wire to an outside display (that is, one not imbedded in or on or directly attached to the seat cover). This is shown in FIG. 6 wherein toilet seat cover 151 with force sensors 153, 155, and 157 and a processor 159 operate as described above, except that the wire 161 extends to a remotely located display 165. Cell 163 powers the device.

FIG. 7 shows a top view of a wireless present invention device. Here, toilet seat cover 201 has sensors 203, 305, 207 and 209, as shown. Processor 211 receives weight data from the four force sensors and transmit it wirelessly through transmitter 213 to display 215. Display 215 is wall mounted, but because it has a flat bottom, it could alternatively be set on a horizontal surface such as a sink or countertop. Additionally, display 165 could be programmable to store or store and compare weights, for example, by person and by date of fixed or arbitrarily chosen or programmed periods. Display 165 could be any size, from credit card size to a larger display, and may be any known display technology, including CRT, LCD, plasma, etc.

Obviously, numerous modifications and variations of the present invention are possible in light of the above teachings. It is therefore understood that within the scope of the appended claims, the invention may be practiced otherwise than as specifically described herein.

What is claimed is:

1. A toilet seat cover scale device for weighing, which comprises:
   a.) a toilet seat cover including hinge means for hinged attachment to a toilet seat;
   b.) a scale mechanism connected to said toilet seat cover, said scale mechanism having at least two force sensors located on a bottom of said toilet seat cover for contact with a toilet seat when said toilet seat cover is attached to a toilet seat and is in a closed position, said force sensors having capacity for weight force measurement, means to transmit said weight force measurement to a processor, said scale mechanism including a processor for converting weight force measurements to an accurate total weight measurement, said processor having means to transmit said accurate total weight measurement in a display;
   c.) a display functionally connected to said scale mechanism processor for receiving and displaying said accurate total weight measurement; and;
   d.) power means connected to said processor to provide power thereto.

2. The toilet seat cover scale device of claim 1 wherein said display is wired to said processor.

3. The toilet seat cover scale device of claim 2 wherein said display is firmly mounted to said toilet seat cover.

4. The toilet seat cover scale device of claim 2 wherein said display is movable and unconnected to said toilet seat except for wire for being wired to said processor.

5. The toilet seat cover scale device of claim 1 wherein said display is functionally connected to said processor in a wireless connection.

6. The toilet seat cover scale device of claim 1 wherein said scale mechanism includes at least three force sensors, two of which are side located and one of which is forward located.

7. The toilet seat cover scale device of claim 1 wherein said hinge means includes a floating hinge section to permit vertical movement of said toilet seat cover relative to a toilet seat to which it may be mounted, said vertical movement between said toilet seat cover and said toilet seat.

8. The toilet seat cover scale device of claim 1 wherein said toilet seat cover is a plastic toilet seat cover.

9. The toilet seat cover scale device of claim 1 wherein said power source is a battery and is removably connected for replacement thereof.

10. The toilet seat cover scale device of claim 1 wherein said display is selected from the group consisting of an audio display, an LCD display, and LED display, a plasma display and combinations thereof.

11. A toilet seat scale system, which comprises:
   a.) a toilet seat cover including hinge means for hinged attachment to a toilet seat;
   b.) a scale mechanism connected to said toilet seat cover, said scale mechanism having at least two force sensors located on a bottom of said toilet seat cover for contact with a toilet seat when said toilet seat cover is attached to a toilet seat and is in a closed position, said force sensors having capacity for weight force measurement, means to transmit said weight force measurement to a processor, said scale mechanism including a processor for converting weight force measurements to an accurate total weight measurement, said processor having means to transmit said accurate total weight measurement in a display;
   c.) a display functionally connected to said scale mechanism processor for receiving and displaying said accurate total weight measurement;
   d.) power means connected to said processor to provide power thereto; and,
   e.) a toilet seat hingedly connected to said toilet seat cover.

12. The toilet seat cover scale device of claim 11 wherein said display is wired to said processor.

13. The toilet seat cover scale device of claim 12 wherein said display is firmly mounted to said toilet seat cover.

14. The toilet seat cover scale device of claim 12 wherein said display is movable and unconnected to said toilet seat except for wire for being wired to said processor.

15. The toilet seat cover scale device of claim 11 wherein said display is functionally connected to said processor in a wireless connection.

16. The toilet seat cover scale device of claim 11 wherein said scale mechanism includes at least three force sensors, two of which are side located and one of which is forward located.

17. The toilet seat cover scale device of claim 11 wherein said hinge means includes a floating hinge section to permit vertical movement of said toilet seat cover relative to a toilet seat to which it may be mounted, said vertical movement between said toilet seat cover and said toilet seat.

18. The toilet seat cover scale device of claim 11 wherein said toilet seat cover is a plastic toilet seat cover.

19. The toilet seat cover scale device of claim 11 wherein said power source is a battery and is removably connected for replacement thereof.

20. The toilet seat cover scale device of claim 11 wherein said display is selected from the group consisting of an audio display, an LCD display, and LED display, a plasma display and combinations thereof.

* * * * *